March 18, 1924.

E. C. JACOBSON

TIRE

Filed Oct. 7, 1922

1,487,165

E. C. Jacobson INVENTOR

BY Victor J. Evans ATTORNEY

WITNESSES

Patented Mar. 18, 1924.

1,487,165

UNITED STATES PATENT OFFICE.

ELMER C. JACOBSON, OF ROY, WASHINGTON.

TIRE.

Application filed October 7, 1922. Serial No. 593,026.

*To all whom it may concern:*

Be it known that I, ELMER C. JACOBSON, a citizen of the United States, residing at Roy, in the county of Pierce and State of Washington, have invented new and useful Improvements in Tires, of which the following is a specification.

This invention relates to a tire, the general object of the invention being to provide a detachable tread part for the tire.

Another object of the invention is to provide means for holding the tread part from slipping off the tire and preventing it from moving on the tire.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
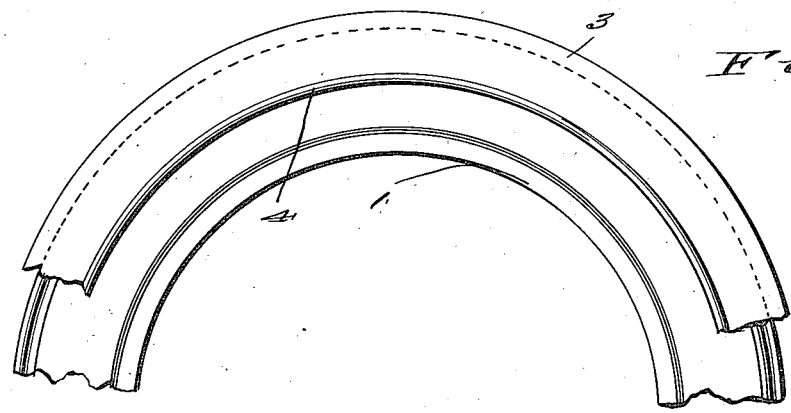
Figure 1 is a side view of a tire constructed in accordance with my invention.
Figure 2:
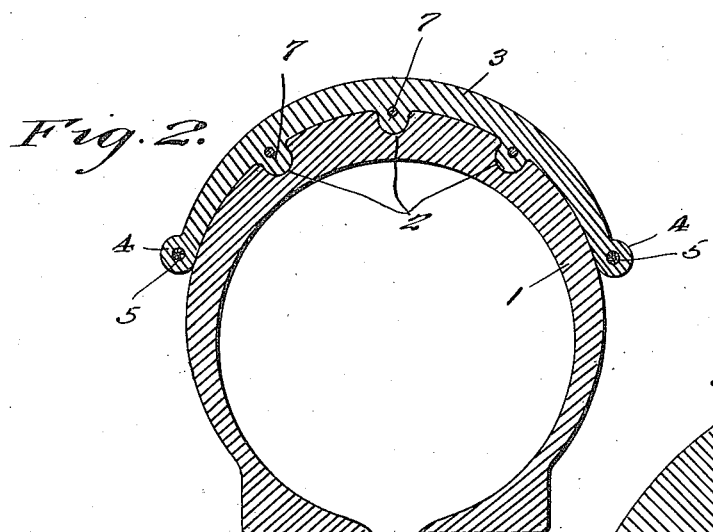
Figure 2 is a transverse section.
Figures 3, 4:
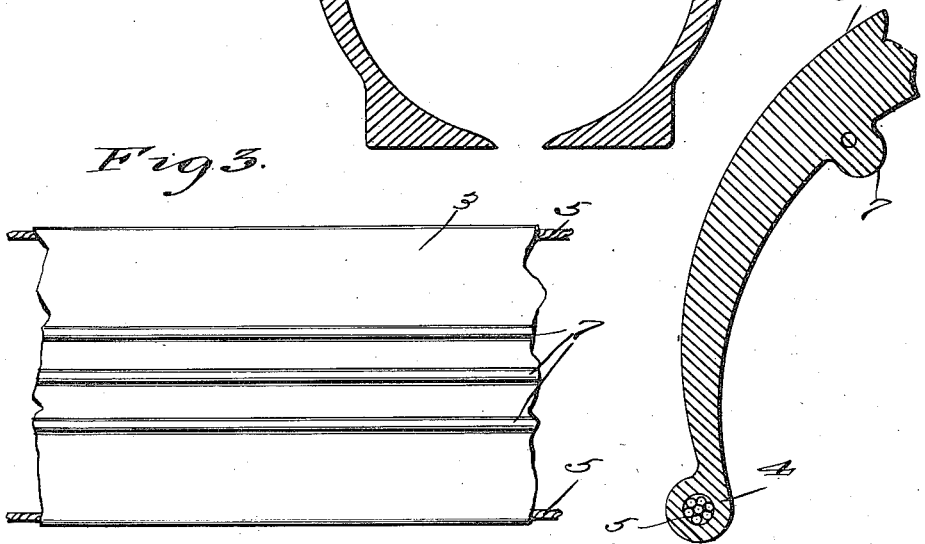
Figures 3 and 4 are detail views.

In these views 1 indicates the tire which is provided with circumferentially extending grooves 2 in its tread part. The detachable tread is shown at 3, and this tread is of substantially semi-circular shape in cross section and has beads 4 at its edges through which pass a plurality of wires 5. The inner face of the tread is provided with a number of circumferentially extending projections 7 which are designed to engage the grooves 2.

The tread is placed on the tire when the same is in deflated condition and then the tire is inflated. The projections and beads act to hold the tread in place and also act to prevent movement of the tread on the tire. This tread will prevent punctures and will take the wear off the tire. After the tread has become worn it can be replaced by a new one or the tire can be used without it.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A tire of the class described comprising a shoe having circumferentially extending grooves in its tread portion, and a tread member of trough shape in cross section having circumferentially extending ribs on its inner face for engaging the grooves in the shoe, said tread member having portions extending laterally beyond said ribs, said portions at their outer edges provided with beads, and said ribs and beads having reinforcing wires therein to prevent the said member from expanding and permitting the ribs to move relatively to the said circumferentially extending grooves.

In testimony whereof I affix my signature.

ELMER C. JACOBSON.